United States Patent
Yankner et al.

(10) Patent No.: US 6,322,721 B1
(45) Date of Patent: Nov. 27, 2001

(54) QUATERNARY AMMONIUM SALT VULCANIZATION ACCELERATORS FOR RUBBERS AND PLASTICS

(75) Inventors: Paul R. Yankner, Englewood; Susan Wright, Roselle Park, both of NJ (US)

(73) Assignee: Technical Processing, Inc., Paterson, NJ (US)

(*) Notice: Subject to any disclaimer, the term of this patent is extended or adjusted under 35 U.S.C. 154(b) by 0 days.

(21) Appl. No.: 09/139,057

(22) Filed: Aug. 24, 1998

(51) Int. Cl.$^7$ .................................................. C09K 3/00

(52) U.S. Cl. ..................... 252/182.16; 252/182.13; 252/182.15; 252/182.23

(58) Field of Search .................. 252/186.43, 182.13, 252/182.15, 182.16, 182.23

(56) References Cited

U.S. PATENT DOCUMENTS

| | | | |
|---|---|---|---|
| 4,013,821 | * 3/1977 | Engelskirchen et al. | 536/88 |
| 4,434,286 | * 2/1984 | Burhans et al. | 528/297 |
| 5,095,068 | * 3/1992 | Chiu | 524/525 |
| 5,149,272 | * 9/1992 | Wu et al. | 436/97 |
| 5,516,798 | * 5/1996 | Ferket | 514/556 |

FOREIGN PATENT DOCUMENTS 0 376 876   7/1990   (EP) .

OTHER PUBLICATIONS

Chemical Abstract Accession No. 116: 168349 (1990).*
*Pankratov, V. et al., "Influence of triethylalkylammonium bromides on the sulphur vulcanisation of diene rubbers." International Polymer Science and Technology, vol. 22, No. 12 (1995), pp. T–1–T–3.

* cited by examiner

Primary Examiner—Joseph D. Anthony
(74) Attorney, Agent, or Firm—Kenyon & Kenyon

(57) ABSTRACT

Rubber and plastic accelerator formulations of the present invention are directed to formulations containing an accelerator compound comprised of an organic-based quaternary ammonium salt. Preferably, the accelerator compound of the present invention is comprised of a quaternary ammonium salt selected from the group consisting of trimethylbetahydroxyethyl ammonium hydroxide (TMBHEAH), carboxymethyltrimethyl ammonium hydroxide (CMTAH), methylallylbenzylphenol ammonium iodide, benzyltriethyl ammonium chloride, hexadecyltrimethyl ammonium chloride imidazolium compounds. As particularly preferred embodiments, the accelerator formulations are comprised of a choline based compound comprised of trimethylbetahydroxyethyl ammonium hydroxide and/or of a betaine compound comprised of carboxymethyltrimethyl ammonium hydroxide. These accelerator formulations are far more effective as they offer considerably improved physical properties with only one-half the use as compared to the rubber accelerators currently used by the rubber industry. The accelerator formulations of the present invention are non-toxic.

3 Claims, No Drawings

QUATERNARY AMMONIUM SALT VULCANIZATION ACCELERATORS FOR RUBBERS AND PLASTICS

FIELD OF INVENTION

The present invention is directed toward rubber and plastic accelerator formulations that exhibit unique, superior effectiveness for accelerating the vulcanization of rubber and plastic compounds. Such effectiveness is achieved in natural rubber, synthetic rubbers, elastomers and fluoroelastomers and in blends of natural and synthetic rubbers and plastics.

BACKGROUND OF THE INVENTION

Chemicals that are used to accelerate the vulcanization process may be referred to as accelerator chemicals, rubber accelerators or plastic accelerators. Such chemicals accelerate the vulcanization or curing process during which cross-linking reactions take place that cause the product rubbers, plastics or rubber/plastic blends to have a desired set of characteristics. The accelerator chemicals, rubber accelerators or plastic accelerators may also, therefore, be referred to as cross-linking agents.

Chemicals that are typically used to accelerate the rubber vulcanization process are toxic. Many such chemicals cause defects by bleeding out of the rubber compound after having been cured. Many accelerator chemicals cause staining and discoloring of light-colored rubber compounds. Certain widely used accelerators lack storage stability, breaking down chemically after 4–6 months. Many accelerator chemicals have foul, pungent odors and are difficult to work with.

For many rubbers such as EPDM rubbers (which are ethylene-propylene-diene-monomer-based rubber compounds), nitrile rubber, Hypalon and Neoprene, ultra and secondary accelerators are required in addition to the primary accelerator to quickly obtain full cure. Two to as many as four of the ultra and one of the secondary accelerators are typically used in small amounts, usually from about 1 wt % to 2 wt %. These chemicals are toxic and very costly and, furthermore, pose a difficult problem to admix correctly and uniformly into rubber compounds in the small amounts required. If a slightly higher amount, on the order of 0.25 wt %, of an ultra accelerator is inadvertently added into the rubber compound, the rubber compound scorches badly during processing and becomes overcured, causing lower physical properties than what is typically required or desired. Usually such rubber batches are scraped as a total loss.

If the amount of the ultra accelerators is slightly lower than what is required the rubber compound becomes undercured. This causes the rubber compound to have physical properties of lower quality than what is required in properly cured rubber compounds. Such batches are also usually scraped or offered at much lower prices as off-specification.

For EPDM and nitrile rubbers, two to four ultra accelerators are typically required in addition to the primary accelerator so as to obtain fast, complete cure. The ultra accelerators are usually captax, methyl tuads, sulfads, ethyl tellurac, as made, for example, by R. T. Vanderbilt. The primary accelerator is usually Santocure NS, as provided by Monsanto.

To cure Hypalon (made by E. I. Dupont) a high percentage of litharge (lead monoxide, PbO) is typically required, that is, about 10%. Since litharge is a lead-based chemical, it is very toxic. Furthermore, litharge tends to cause rubber compounds to become very scorchy during processing. In addition, Hypalon typically requires additional accelerators, plus the litharge vulcanizing agent, to obtain a fast and complete cure. The secondary accelerators that are typically used are zinc oxide and Tetrone A.

For neoprene rubber, which tends to be scorchy during processing, zinc oxide and Magalite D are typically used to obtain a fast and complete cure. During such processing steps undesirable toxic fumes may be produced.

ADVANTAGES AND SUMMARY OF THE INVENTION

The present invention is directed to accelerator formulations that are useful for accelerating the vulcanization of rubber and plastic compounds. Such formulations are capable of producing rubbers having improved properties as well as reducing or eliminating some of the disadvantages of prior art rubber accelerators. For example, if the rubber and plastic accelerator formulations of the present invention are used to replace the prior art primary accelerators that are typically used for curing EPDM or nitrile rubbers, the ultra and secondary accelerators are unnecessary and may be eliminated.

In addition, if the accelerators of the present invention and Tetrone A are used to cure Hypalon rubber, the litharge can be eliminated and the secondary accelerators are also not required to quickly develop a complete cure.

If the accelerators of the present invention are used to cure neoprene rubber, Magalite D and all other secondary accelerators that are typically used, including peroxide and/or sulfur, are unnecessary and may be completely eliminated. The accelerators of this invention, in combination with only about 5% zinc oxide, may be characterized as functioning as cross-linking agents. As a result, this is a new "curing process" that is as fast or faster than current rubber curing processes.

Further objectives and advantages of the present invention will be apparent to those skilled in the art from the detailed description of the disclosed invention.

DETAILED DESCRIPTION OF THE PREFERRED EMBODIMENTS

The present invention will now be described in detail for specific preferred embodiments of the invention, it being understood that these embodiments are intended only as illustrative examples and the invention is not to be limited thereto.

The present invention is directed to rubber and plastic accelerator formulations that may be used to accelerate the vulcanization of rubber and/or plastic compounds so as to produce rubbers and plastics having improved properties. Such vulcanization processes may require no additional or secondary accelerators to obtain fast, complete cure. The vulcanization or curing process may involve treatment of a composition comprised of a single rubber compound or a single plastic compound, a blend of rubber compounds, a blend of plastic compounds or a blend of rubber and plastic compounds. The term "rubber and plastic accelerator" formulation is, thus, used generally to refer to an accelerator that may be used in vulcanizing or curing a rubber and/or plastic composition without regard to whether the specific rubber and plastic accelerator is particularly preferred for a specific rubber and/or plastic composition.

The formulations of the present invention are directed to formulations containing an accelerator compound comprised of an organic-based quaternary ammonium salt. Preferably, the organic-based quaternary ammonium salt may include, for example, a salt selected from the group consisting of trimethylbetahydroxyethyl ammonium hydroxide (TMBHEAH), carboxymethyltrimethyl ammonium hydroxide (CMTAH), methylallylbenzylphenol ammonium iodide, benzyltriethyl ammonium chloride, hexadecyltrimethyl ammonium chloride and imidazolium compounds.

The accelerator compounds of the present invention are preferably present as a halide or a hydroxide. The accelerator compounds may be included in a rubber and plastic accelerator formulation that may further include additional ingredients such as:

a hydrated silica compound, for example, Tixocil 38 AB, which is available from Rhone-Poulenc of Cranbury, N.J., and which functions as an absorbent that produces an end product in powdered form;

an inorganic peroxide, for example, $CaO_3$, which functions as a cross-linking agent by providing free oxygen to oxidize the carbon double bonds;

an additional inorganic compound, for example, ZnO, which may transiently form $ZnO_2$ for accelerating the peroxide oxidation step;

an alkaline silicate, for example, $Na_2O_3Si$, for increasing the overall alkalinity of the formulation;

a silicone copolymer fluid, for example, "L7602," available from Witco Chemical Co. of Greenwich, Conn., which is a polyalkalene-oxide-modified polydimethylsiloxane that functions to wet-out the rubber and plastic compounds for fast interaction and synergize the entire process;

a free fatty acid ester, for example, isopropylmyristate (IPM), $CH_3(CH_2)_2COOCH(CH_3)_2$, which functions to emulsify the accelerator formulation to a homogenous, stable condition;

a tertiary amine such as 2-(8-heptadecenyl)-4,5-dihydro-, (Z)-1H-imidalole-1-ethanol, which is provided as Monazoline O by Mona Industries of Paterson, N.J.;

a percarbonate such as sodium percarbonate;

a preservative, for example, butylated hydroxy anisole, butylated hydroxy toluene, and monoethanolamine; and one or more of the accelerator compounds of the present invention, for example the choline base of trimethylbetahydroxyethyl ammonium hydroxide and/or the betaine inner salt of carboxy methyltrimethyl ammonium hydroxide.

The total quantity of the organic-based quaternary ammonium salt compounds that are present in the accelerator formulations of the present invention may be from about 5 wt % to about 25 wt %, though quantities outside this range may also be useful for certain types of formulations. Preferably, the total quantity is from about 10 wt % to 20 wt %. Based on the total parts by weight of the base composition of rubber and/or plastic compounds or blends, the total quantity of the accelerator formulation may be from about 0.1 wt % to about 5 wt %, though the total quantity of the accelerator formulation may also be outside this range under certain circumstances. In the representative embodiments of the present invention, as disclosed herein, about 11 wt % of the choline base compound and about 5.5 wt % of the betaine compound are present in the accelerator formulation and about 0.35 wt % to about 4.5 wt %, based on the rubber and/or plastic base composition, of the accelerator formulation is present in the rubber and/or plastic base composition. However, the accelerator compounds of the present invention, for example, the choline and the betaine compounds may also be used exclusively, without the other enhancing ingredients of the accelerator formulation, as highly effective accelerators.

Other enhancing ingredients can also be used if found to be equally or more effective.

The additional ingredients of the accelerator formulations, if present, are present in an amount sufficient for the hydrated silica compound to produce a powder form end product; for the inorganic peroxide to promote cross-linking of the molecular chain; for the hydrated silica to provide additional solid support; for the alkaline silicate to speed up cure rate; for the silicone copolymer fluid to wet-out the rubber and plastic compounds for fast interaction and synergize the entire process; and for the free fatty acid to emulsify the accelerator formulation to a homogenous, stable condition.

The additional ingredients in the accelerator formulations of this invention are used to enhance the activity of the accelerator compound, to stabilize and to produce an end product in powdered form.

Such compounds are preferably included in a separately prepared formulation that is added to the uncured rubber and/or plastic compound. However, the accelerator compounds of the present invention may also be added directly to the uncured rubber and/or plastic compounds.

Thus, the accelerator formulations of the present invention may be prepared using ingredients and preparation methods which result in formulations having significant improvements and advantages over prior and current state of art formulations. Such formulations may be prepared using methods known in the art.

In addition, the present invention is directed to the rubber and/or plastic compounds obtained by vulcanizing or curing a rubber-containing, plastic-containing or rubber-and plastic-containing composition with the accelerators or accelerator formulations comprised of an accelerator compound of an organic-based quaternary ammonium salt. Preferably, the rubber and/or plastic compounds obtained by vulcanizing or curing a rubber-containing, plastic-containing or rubber- and plastic-containing composition are obtained with an accelerator compound comprised of a quaternary ammonium salt selected from the group consisting of trimethylbetahydroxyethyl ammonium hydroxide (TMBHEAH), carboxymethyltrimethyl ammonium hydroxide (CMTAH), methylallylbenzylphenol ammonium iodide, benzyltriethyl ammonium chloride, hexadecyltrimethyl ammonium chloride and imidazolium compounds. The rubber- and/or plastic-containing composition may be comprised of a composition selected from the group consisting of a rubber compound, a plastic compound, a blend of rubber compounds, a blend of plastic compounds and a blend of at least one rubber compound and at least one plastic compound. Such compositions may be comprised of natural rubber, synthetic rubbers, elastomers, fluoroelastomers, plastics or blends of rubbers, plastics, and rubbers and plastics.

As representative embodiments thereof, the present invention may be directed to a rubber compound comprised of a natural rubber or a blend of a natural rubber, a polybutadiene rubber and a synthetic butadiene rubber; an EPDM rubber; a Neoprene rubber; a natural rubber; a Hypalon elastomer; a blend of a polyethylene and polyisoprene elastomer, wherein the polyethylene resin may be a carbon-black-filled polyethylene resin; a blend of a PVC (polyvinylchloride) resin and a polyisoprene elastomer, wherein the PVC resin may be a carbon-black-filled PVC resin; an ABS resin and an EPDM elastomer, wherein the ABS resin may be a carbon-black-filled ABS resin; or a blend of an ABS-resin and a synthetic butadiene rubber, wherein the ABS-resin may be a carbon-black-filled ABS-resin.

The accelerator formulations of the present invention are non-toxic. They offer a degree of safety in use and handling that is not available with the toxic rubber accelerators currently used in the rubber industry. Moreover, the accelerators of the present invention cause no defects to rubber products in which they are used. Such formulations are stable and can be stored for long periods without reacting or breaking down chemically. They are non-staining and non-discoloring to light-colored rubber or plastic products. They do not give off foul, pungent odors and they have a bland, mild odor. In effect, the accelerators of the present invention provide a degree of safety and freedom from defects for rubber products and persons handling them that is not available with the rubber accelerators, primary, ultra or secondary types, currently used by the rubber industry.

Without being bound by theory, it is believed that the accelerators of the present invention function as catalysts which cause reaction to occur more quickly at lower temperature than the currently used primary or secondary rubber accelerators that typically require much higher temperature to react. When reaction starts with the accelerators of the present invention, cure begins more quickly at lower temperature and proceeds for a longer time period than with usual primary and secondary accelerators. The accelerators of the present invention, in the time frame allotted to cure rubber and plastic compounds, are able to provide complete cure of rubber and plastic compounds more quickly and to a higher state of cure than is obtained with the usual primary or secondary accelerators, as evidenced by the test results submitted herein.

The rubber and plastic accelerator formulations of the present invention are much more effective than the primary, ultra or secondary rubber accelerators that are currently used either separately or in combination. Currently used accelerators are unable to vulcanize plastics at all. Tests disclosed herein show that the use levels of the accelerators of the present invention provide more effective rubber vulcanization and improved physical properties than are provided by twice the amount of currently used primary accelerator chemicals in natural rubber, synthetic rubber, and blends of different and dissimilar rubbers. Test results indicate that, when used in an equal amount, the accelerators of the present invention produce much improved physical properties in the cured rubber and/or plastic compounds as compared to currently used primary accelerator chemicals, even if ultra or secondary accelerators are included. Such improved properties can be observed, for example as shown in Tables 1–9, with respect to tensile strength, modulus, elongation, tear resistance and compression set.

In addition, the results shown in Table 1–9 show that whenever the accelerators of the present invention are used in rubber and plastic compounds, ultra or secondary accelerators, Magalite D, peroxide and litharge may be unnecessary and can be eliminated from the uncured rubber and plastic compound. Furthermore, sulphur can be used in much smaller amounts.

The results shown in Tables 1–9 also indicate the accelerator formulations of the present invention improve the processing and release of rubber and plastic compounds as compared to the rubber accelerators currently used in the rubber industry. In particular, the rubber and plastic compounds containing the accelerators of the present invention have much lower Mooney viscosity (for better rubber and plastic compound flow) and much lower grams of pull required to release molded units from the molds as compared with the control compounds.

The present invention will now be described in detail with respect to showing how certain specific representative embodiments thereof can be made, the materials, apparatus and process steps being understood as examples that are intended to be illustrative only. In particular, the invention is not intended to be limited to the methods, materials, conditions, process parameters, apparatus and the like specifically recited herein.

EXAMPLES

Representative rubber-accelerator/cross-linking-agent formulations of the present invention were prepared using methods known in the art. As illustrated in Tables 1–9, the following formulations are shown to be highly effective:

| wt % | Ingredient | Chemical Form | Comments |
|---|---|---|---|
| RUBBER AND PLASTIC ACCELERATOR TYPE 15 | | | |
| 10 | Tixocil 38 AB | $SiO_2$—$H_2O$ (hydrated silica) | inorganic solid support |
| 8.5 | Calcium Peroxide | $CaO_3$ (inorganic peroxide) | yields free oxygen to attach to =C |
| 48 | Zinc Oxide | ZnO (inorganic solid support) | to form $ZnO_2$ (zinc peroxide for acceleration) |
| 8 | Sodium Meta-silicate | $Na_2O_3Si$ | adds to overall alkalinity of compound |
| 5 | L7602 | copolymer | silicone fluid polyalkaleneoxide modified polydimethylsiloxane |
| 4 | Isopropyl-myristate | $CH_3(CH_2)_2COOCH(CH_3)_2$ | free fatty acid esters |
| 11 | Choline Base | $[(CH_3)_3NCH_2CH_2OH]^+OH^-$ | trimethylbetahydroxy-ethyl ammonium hydroxide organic base |
| 5.5 | Betaine | $(CH_3)_3N^+CH_2COO^-$ | carboxy methyltrimethyl ammonium hydroxide inner salt |
| RUBBER AND PLASTIC ACCELERATOR TYPE 17 ("TE-Super Accelerator") | | | |
| 8 | Tixocil 38 AB | $SiO_2$—$H_2O$ (hydrated silica) | inorganic solid support |
| 8.5 | Calcium Peroxide | $CaO_3$ (inorganic peroxide) | yields free oxygen to attach to =C |
| 48 | Zinc Oxide | ZnO (inorganic solid support) | to form $ZnO_2$ (zinc peroxide for acceleration) |
| 8 | Sodium Meta-silicate | $Na_2O_3Si$ | adds to overall alkalinity of compound |
| 7 | L7602 | copolymer | silicone fluid, polyalkaleneoxide modified polydimethylsiloxane |
| 4 | Isopropyl-myristate | $CH_3(CH_2)_2COOCH(CH_3)_2$ | free fatty acid esters |
| 11 | Choline Base | $[(CH_3)_3NCH_2CH_2OH]^+OH^-$ | trimethylbeta-hydroxyethyl ammonium hydroxide organic base |
| 5.5 | Betaine | $(CH_3)_3N^+CH_2COO^-$ | carboxy methyltrimethyl ammonium hydroxide |

-continued

| wt % | Ingredient | Chemical Form | Comments |
|---|---|---|---|
| | | | inner salt |
| RUBBER AND PLASTIC ACCELERATOR TYPE 19 | | | |
| 8 | Tixocil 38 AB | $SiO_2$—$H_2O$ (hydrated silica) | inorganic solid support |
| 8.5 | Calcium Peroxide | $CaO_3$ (inorganic peroxide) | yields free oxygen to attach to =C |
| 45 | Zinc Oxide | ZnO (inorganic solid support) | to form $ZnO_2$ (zinc peroxide for acceleration) |
| 8 | Sodium Metasilicate | $Na_2O_3Si$ | adds to overall alkalinity of compound |
| 10 | L7602 | copolymer | silicone fluid, polyalkaleneoxide modified polydimethylsiloxane |
| 4 | Isopropylmyristate | $CH_3(CH_2)_2COOCH(CH_3)_2$ | free fatty acid esters |
| 11 | Choline Base | $[(CH_3)_3NCH_2CH_2OH]^+OH^-$ | trimethylbetahydroxyethyl ammonium hydroxide organic base |
| 5.5 | Betaine | $(CH_3)_3N^+CH_2COO^-$ | carboxy methyltrimethyl ammonium hydroxide inner salt |

The calcium peroxide may be reduced by half with substantially equal effectiveness, that is, from about 8.5 wt % to about 4.25 wt %, and the difference added to the zinc oxide, for example, so as to result in 52.25 wt % zinc oxide in the Type 15 or Type 17 Rubber and Plastic Accelerator.

The choline hydroxide and isopropylmyristate may also be reduced by half with substantially equal effectiveness, that is, from about 11 to about 5.5 wt % and from about 4.0 to about 2.0 wt %, respectively, and the difference also added to the zinc oxide, for example, so as to result in about 55.5 wt % zinc oxide.

The isopropylmyristate may be reduced by half and replaced with an imidazolium quaternary ammonium compound such as 2-(8-heptadecenyl)-4,5-dihydro-1-methyl-1-[2-[(1-oxo-9-octodecenyl)amino]ethyl]-(Z,Z)-1H-imidazolium methyl sulfate, which is available as Varisoft 3690 from Witco Chemical Co., Greenwich, Conn., with substantially equal effectiveness.

The isopropylmyristate may also be reduced by half and replaced with a tertiary amine such as Monazoline 0, available from Mona Industries, Paterson, N.J., also with substantially equal effectiveness.

The calcium peroxide may be replaced by half or even completely with sodium percarbonate with substantially equal effectiveness.

Test results were obtained by using the Type 15, Type 17 (also referred to herein as the "TE-Super Accelerator") and Type 19 accelerator formulations in a high quality truck tire tread compound comprised of blends of natural, polybutadiene and SBR rubbers (Table 1); in an all purpose EPDM molding compound (Table 2) and in an all purpose Neoprene molding compound (Table 3). Tests were also obtained using the Type 17 accelerator formulation in the vulcanization of a carbon black filled ABS-resin with an EPDM elastomer, (Table 4); in the vulcanization of a carbon-black-filled ABS-resin with an SBR elastomer, (Table 5); in the vulcanization of a carbon-black-filled polyethylene resin with a polyisoprene elastomer, (Table 6); in the vulcanization of a carbon-black-filled PVC resin with a polyisoprene elastomer, (Table 7); as a primary accelerator in the preparation of a Hypalon elastomer, (Table 8); and in the preparation of a natural rubber extrusion compound (Table 9).

The "SMR-20" and "SMR-5" compounds refer to a natural rubber, Standard Malaysian Rubber, available from Bridgestone/Firestone Rubber Co., Akron, Ohio;

the "PBD-1252" compound refers to Polybutadiene Rubber available from Bridgestone/Firestone Rubber Co., Akron, Ohio;

the "SBR-1551" or "SBR-1500" compounds refer to Synthetic Butadiene Rubber available from Goodyear Chemical Co., Akron, Ohio;

the "N-339-HAF-HM-Black" refers to High Abrasion Furnace Carbon Black available from Cabot Corp., Houston, Tex.;

the "Sundex-790" compound refers to Paraffinic Process Oil available from Sun Oil Co., Marcus Hook, Pa.;

the "R-M sulfur" refers to Rubber Maker Sulphur available from H. M. Huber, Houston, Tex.;

the "Nordel-1040" refers to EPDM Rubber available from E.I. Dupont, Wilmington, Del.;

the "N-714-SAF-Black" and "N-774-SAF-HM-Black" refer to Super Abrasion Furnace Carbon Black available from Cabot Corp., Houston, Tex.;

the "Circosol-4280" refers to Paraffinic Process Oil available from Sun Oil Co., Marcus Hook, Pa.;

the "Neoprene-W" refers to All Purpose Neoprene Rubber available from E. I. Dupont, Wilmington, Del.;

the "N-990-Thermax black" Conductive Thermal Carbon Black available from Cabot Corp., Houston, Tex.;

the "Light process oil" refers to Paraffinic process oil available from Sun Oil Co., Marcus Hook, Pa.;

the "Varox DCP40-KE" refers to a peroxide cure agent available from R. T. Vanderbilt, Norwalk, Conn.

the "Santocure NS" refers to a primary accelerator from Monsanto Chemical Co., New York, N.Y.;

the "ABS-resin" refers to an acrylic-butadiene-styrene resin;

the "Dos Dioctyl sebacate" refers to a Napathenic plasticizer by Uniroyal Chemical Co., Naugatuck, Conn.;

the "AMAX" refers to an ultra accelerator by R. T. Vanderbilt, oxydiethylene benzothiazole;

the "NATSYN-2200" refers to a natural synthetic Polyisoprene rubber;

the "TETRONE-A" refers to a Napathenic plasticizer by Sun Oil Co.;

the "N-550-FEF Black" refers to fast extrusion furnace carbon black; from Cabot Corp., Houston, Tex.; and the "CIRCO LIGHT oil" refers to napathenic process oil by Sun Oil Co.

Quantities for the rubber and plastic compounds are expressed in parts by weight, to which ½-PHR (parts per hundred of the rubber and/or plastic compound), 1-PHR or 2-PHR of the accelerator formulation were added in some examples.

TABLE 1a

Representative accelerator formulations of the present invention in a high quality truck tire tread compound of a blend of natural, polybutadiene and SBR rubbers.

| Samples added 2½ minutes before dumping batch @ 40-RPM-Rotor speed | Control | Type-15 Powder ½-PHR | Type-15 Powder 1-PHR | Type-15 Powder 2-PHR | Type-17* Powder ½-PHR | Type-17* Powder 1-PHR | Type-17* Powder 2-PHR | Type-19 Powder ½-PHR | Type-19 Powder 1-PHR | Type-19 Powder 2-PHR |
|---|---|---|---|---|---|---|---|---|---|---|
| SMR-20 | 30.00 | 30.00 | 30.00 | 30.00 | 30.00 | 30.00 | 30.00 | 30.00 | 30.00 | 30.00 |
| PBD-1252 | 10.00 | 10.00 | 10.00 | 10.00 | 10.00 | 10.00 | 10.00 | 10.00 | 10.00 | 10.00 |
| SBR-1551 | 55.00 | 55.00 | 55.00 | 55.00 | 55.00 | 55.00 | 55.00 | 55.00 | 55.00 | 55.00 |
| N-339-HAF-HM-Black | 60.00 | 60.00 | 60.00 | 60.00 | 60.00 | 60.00 | 60.00 | 60.00 | 60.00 | 60.00 |
| Zinc Oxide | 5.00 | 5.00 | 5.00 | 5.00 | 5.00 | 5.00 | 5.00 | 5.00 | 5.00 | 5.00 |
| Stearic Acid | 1.25 | 1.25 | 1.25 | 1.25 | 1.25 | 1.25 | 1.25 | 1.25 | 1.25 | 1.25 |
| Sundex-790 | 9.00 | 9.00 | 9.00 | 9.00 | 9.00 | 9.00 | 9.00 | 9.00 | 9.00 | 9.00 |
| Type-15-Powder | — | .35 | .70 | 1.40 | — | — | — | — | — | — |
| Type-17-Powder | — | — | — | — | .35 | .70 | 1.40 | — | — | — |
| Type-19-Powder | — | — | — | — | — | — | — | .35 | .70 | 1.40 |
| Santo Cure-NS | .70 | — | — | — | — | — | — | — | — | — |
| R-M-Sulphur | 3.00 | 1.00 | .75 | 2.5 | 1.00 | .75 | .25 | 1.00 | .75 | .25 |
| TOTALS | 173.95 | 171.60 | 171.70 | 171.90 | 171.60 | 171.70 | 171.90 | 171.60 | 171.70 | 171.90 |

*Also referred to a STE-Super Accelerator.

TABLE 1b

Physical properties of the product compounds of Table 1a.

| Observed Results | Control | Type-15 Powder ½-PHR | Type-15 Powder 1-PHR | Type-15 Powder 2-PHR | Type-17* Powder ½-PHR | Type-17* Powder 1-PHR | Type-17* Powder 2-PHR | Type-19 Powder ½-PHR | Type-19 Powder 1-PHR | Type-19 Powder 2-PHR |
|---|---|---|---|---|---|---|---|---|---|---|
| Dump Temperature | 290° F. | 280° F. | 280° F. | 280° F. | 280° F. | 275° F. | 275° F. | 275° F. | 275° F. | 275° F. |
| Mixing Time | 8-min. | 8-min. | 8-min. | 8-min. | 8-min. | 8-min. | 8-min. | 8-min. | 8-min. | 8-min. |
| ● = Add Sulphur on mill | ● | ● | ● | ● | ● | ● | ● | ● | ● | ● |
| Mooney-ML-4 @ 212° F. | 59 | 56 | 55 | 55 | 55 | 55 | 55 | 54 | 54 | 54 |
| Scorch @ 320° F. | 8-min. | 8-min. | 8-min. | 8-min. | 8-min. | 8-min. | 8-min. | 8-min. | 8-min. | 8-min. |
| 100 wt % Cure @ 320° F. | 12-min. | 12-min. | 12-min. | 12-min. | 12-min. | 12-min. | 12-min. | 12-min. | 12-min. | 12-min. |
| Tensile-PSI | 3795 | 3950 | 3950 | 4010 | 4575 | 4575 | 4575 | 4570 | 4575 | 4575 |
| Modulus @ 100 wt % | 400 | 410 | 410 | 425 | 470 | 470 | 470 | 470 | 470 | 470 |
| Elongation wt % | 500 | 520 | 520 | 525 | 560 | 560 | 560 | 550 | 560 | 560 |
| Die "C" Tear | 300 | 310 | 310 | 310 | 340 | 340 | 340 | 340 | 340 | 340 |
| Grams Release Mold | 4791 | 4766 | 4712 | 4318 | 4331 | 4301 | 4291 | 4310 | 4360 | 4410 |
| Shore "A" Hardness | 65 | 65 | 65 | 65 | 65 | 65 | 65 | 65 | 65 | 65 |
| Compression Set: (ASTM-D-395-Method-B) | 14 | 13 | 13 | 12 | 9 | 9 | 9 | 10 | 9 | 9 |

*Also referred to as TE-Super Accelerator.

TABLE 2a

Representative accelerator formulations of the present invention in an all purpose EPDM molding compound.

| Samples added 2½ minutes before dumping batch @ 40-RPM-Rotor speed | Control | Type-15 Powder ½-PHR | Type-15 Powder 1-PHR | Type-15 Powder 2-PHR | Type-17* Powder ½-PHR | Type-17* Powder 1-PHR | Type-17* Powder 2-PHR | Type-19 Powder ½-PHR | Type-19 Powder 1-PHR | Type-19 Powder 2-PHR |
|---|---|---|---|---|---|---|---|---|---|---|
| Nor Del-1040 | 100.00 | 100.00 | 100.00 | 100.00 | 100.00 | 100.00 | 100.00 | 100.00 | 100.00 | 100.00 |
| N-714-SAF-Black | 180.00 | 180.00 | 180.00 | 180.00 | 180.00 | 180.00 | 180.00 | 180.00 | 180.00 | 180.00 |
| Circosol-428O | 105.00 | 105.00 | 105.00 | 105.00 | 105.00 | 105.00 | 105.00 | 105.00 | 105.00 | 105.00 |
| Stearic Acid | 1.00 | 1.00 | 1.00 | 1.00 | 1.00 | 1.00 | 1.00 | 1.00 | 1.00 | 1.00 |
| Zinc Oxide | 5.00 | 5.00 | 5.00 | 5.00 | 5.00 | 5.00 | 5.00 | 5.00 | 5.00 | 5.00 |
| Type-15-Powder | — | .50 | 1.00 | 2.00 | — | — | — | — | — | — |
| Type-17-Powder | — | — | — | — | .50 | 1.00 | 2.00 | — | — | — |

TABLE 2a-continued

Representative accelerator formulations of the present invention in an all purpose EPDM molding compound.

| Samples added 2½ minutes before dumping batch @ 40-RPM-Rotor speed | Control | Type-15 Powder ½-PHR | Type-15 Powder 1-PHR | Type-15 Powder 2-PHR | Type-17* Powder ½-PHR | Type-17* Powder 1-PHR | Type-17* Powder 2-PHR | Type-19 Powder ½-PHR | Type-19 Powder 1-PHR | Type-19 Powder 2-PHR |
|---|---|---|---|---|---|---|---|---|---|---|
| Type-19-Powder | — | — | — | — | — | — | — | .50 | 1.00 | 2.00 |
| Captax | 1.75 | — | — | — | — | — | — | — | — | — |
| Methyltuads | 1.50 | — | — | — | — | — | — | — | — | — |
| Ethyl Tullurac | 1.00 | — | — | — | — | — | — | — | — | — |
| Sulfads | 1.00 | — | — | — | — | — | — | — | — | — |
| R-M-Sulphur | 1.00 | .50 | .25 | .10 | .50 | .25 | .10 | .50 | .25 | .10 |
| TOTALS | 397.25 | 392.00 | 392.25 | 393.10 | 392.00 | 392.25 | 393.10 | 392.00 | 392.25 | 393.10 |

*Also referred to as TE-Super Accelerator.

TABLE 2b

Physical properties of the product compounds of Table 2a.

| Observed Results | Control | Type-15 Powder ½-PHR | Type-15 Powder 1-PHR | Type-15 Powder 2-PHR | Type-17* Powder ½-PHR | Type-17* Powder 1-PHR | Type-17* Powder 2-PHR | Type-19 Powder ½-PHR | Type-19 Powder 1-PHR | Type-19 Powder 2-PHR |
|---|---|---|---|---|---|---|---|---|---|---|
| Mixing Time | 6-min. | 6-min. | 6-min. | 6-min. | 6-min. | 6-min. | 6-min. | 6-min. | 6-min. | 6-min. |
| Dump Temperature | 270° F. | 240° F. | 240° F. | 235° F. | 240° F. | 240° F. | 240° F. | 245° F. | 240° F. | 240° F. |
| ● = Add Sulphur on mill | ● | — | — | — | — | — | — | — | — | — |
| Mooney-ML-4 @ 212° F. | 61 | 57 | 57 | 56 | 56 | 55 | 55 | 53 | 53 | 53 |
| Scorch @ 320° F. | 6-min. | 6-min. | 6-min. | 6-min. | 6-min. | 6-min. | 6-min. | 6-min. | 6-min. | 6-min. |
| 100 wt % Cure @ 320° F. | 9-min. | 9-min. | 9-min. | 9-min. | 9-min. | 9-min. | 9-min. | 9-min. | 9-min. | 9-min. |
| Tensil-PSI | 1960 | 3005 | 3005 | 3010 | 3005 | 3010 | 3010 | 3010 | 3010 | 3010 |
| Modulus @ 100 wt % | 690 | 740 | 740 | 750 | 740 | 750 | 750 | 740 | 750 | 750 |
| Elongation wt % | 360 | 380 | 380 | 385 | 380 | 385 | 385 | 385 | 385 | 385 |
| Die "C" Tear | 320 | 375 | 375 | 380 | 375 | 380 | 380 | 370 | 380 | 380 |
| Grams Release Mold | 4833 | 4602 | 4581 | 4512 | 4416 | 4497 | 4412 | 4397 | 4371 | 4340 |
| Shore "A" Hardness | 70 | 70 | 70 | 70 | 70 | 70 | 70 | 70 | 70 | 70 |
| Compression Set: (ASTM-D-395-Method-B) | 15 | 12 | 11 | 11 | 12 | 11 | 11 | 12 | 11 | 11 |

*Also referred to as TE-Super Accelerator.

TABLE 3a

Representative accelerator formulations of the present invention in an all purpose Neoprene molding compound.

| Samples added 2½ minutes before dumping batch @ 40-RPM-Rotor speed | Control | Type-15 Powder ½-PHR | Type-15 Powder 1-PHR | Type-15 Powder 2-PHR | Type-17* Powder ½-PHR | Type-17* Powder 1-PHR | Type-17* Powder 2-PHR | Type-19 Powder ½-PHR | Type-19 Powder 1-PHR | Type-19 Powder 2-PHR |
|---|---|---|---|---|---|---|---|---|---|---|
| Neoprene-W | 100.00 | 100.00 | 100.00 | 100.00 | 100.00 | 100.00 | 100.00 | 100.00 | 100.00 | 100.00 |
| N-990-Thermax Black | 85.00 | 85.00 | 85.00 | 85.00 | 85.00 | 85.00 | 85.00 | 85.00 | 85.00 | 85.00 |
| Stearic Acid | .50 | .50 | .50 | .50 | .50 | .50 | .50 | .50 | .50 | .50 |
| Light Process Oil | 6.00 | 6.00 | 6.00 | 6.00 | 6.00 | 6.00 | 6.00 | 6.00 | 6.00 | 6.00 |
| Zinc Oxide | 5.00 | 5.00 | 5.00 | 5.00 | 5.00 | 5.00 | 5.00 | 4.00 | 4.00 | 4.00 |
| Magalite-D | 4.00 | 1.00 | — | — | — | — | — | — | — | — |
| Type-15-Powder | — | .50 | 1.00 | 2.00 | — | — | — | — | — | — |
| Type-17-Powder | — | — | — | — | .50 | 1.00 | 2.00 | — | — | — |
| Type-19-Powder | — | — | — | — | — | — | — | .50 | 1.00 | 2.00 |
| Varox DCP-40-KE | 1.00 | — | — | — | — | — | — | — | — | — |
| TOTALS | 201.50 | 198.00 | 197.50 | 198.50 | 197.00 | 197.50 | 198.50 | 196.00 | 196.50 | 197.50 |

*Also referred to as TE-Super Accelerator.

TABLE 3b

Physical properties of the product compounds of Table 3a.

| Observed Results | Control | Type-15 Powder ½-PHR | Type-15 Powder 1-PHR | Type-15 Powder 2-PHR | Type-17* Powder ½-PHR | Type-17* Powder 1-PHR | Type-17* Powder 2-PHR | Type-19 Powder ½-PHR | Type-19 Powder 1-PHR | Type-19 Powder 2-PHR |
|---|---|---|---|---|---|---|---|---|---|---|
| Mixing Time | 6-min. | 6-min. | 6-min. | 6-min. | 6-min. | 6-min. | 6-min. | 6-min. | 6-min. | 6-min. |
| Dump Temperature | 270° F. | 260° F. | 260° F. | 260° F. | 260° F. | 260° F. | 260° F. | 260° F. | 260° F. | 260° F. |
| ● = Add Zinc on mill | ● | ● | ● | ● | ● | ● | ● | ● | ● | ● |
| Mooney-ML-4 @ 212° F. | 44 | 43 | 42 | 42 | 42 | 42 | 42 | 41 | 41 | 41 |
| Scorch @ 320° F. | 5-min. | 5-min. | 5-min. | 5-min. | 5-min. | 5-min. | 5-min. | 5-min. | 5-min. | 5-min. |
| 100 wt % Cure @ 320° F. | 9-min. | 9-min. | 9-min. | 9-min. | 9-min. | 9-min. | 9-min. | 9-min. | 9-min. | 9-min. |
| Tensil-PSI | 1800 | 1960 | 1960 | 2640 | 2180 | 2250 | 2580 | 2240 | 2250 | 2580 |
| Modulus @ 100 wt % | 340 | 360 | 360 | 400 | 380 | 400 | 410 | 390 | 400 | 410 |
| Elongation wt % | 400 | 440 | 440 | 480 | 450 | 480 | 500 | 470 | 480 | 500 |
| Die "C" Tear | 200 | 265 | 270 | 300 | 290 | 310 | 320 | 290 | 310 | 310 |
| Grams Release Mold | 5027 | 4717 | 4702 | 4613 | 4588 | 4497 | 4507 | 4514 | 4384 | 4366 |
| Shore "A" Hardness | 70 | 70 | 70 | 70 | 70 | 70 | 70 | 70 | 70 | 70 |
| Compression Set: (ASTM-D-395-Method-B) | 16 | 11 | 10 | 9 | 9 | 8 | 8 | 8 | 8 | 8 |

*Also referred to as TE-Super Accelerator.

TABLE 4a

Vulcanization of a carbon-black-filled ABS-resin with an EPDM elastomer using TE-Super Accelerator Type-17 powder.

| Samples added 2½ minutes before dumping batch @ 40-RPM-Rotor speed | Control | Control | Control | Type-17 Powder | Type-17 Powder | Type-17 Powder | Type-17 Powder | Type-17 Powder | Type-17 Powder |
|---|---|---|---|---|---|---|---|---|---|
| ABS-Resin | 50.00 | 50.00 | 50.00 | 50.00 | 50.00 | 50.00 | 50.00 | 50.00 | 50.00 |
| Nordel-1040 | 50.00 | 50.00 | 50.00 | 50.00 | 50.00 | 50.00 | 50.00 | 50.00 | 50.00 |
| U.V. Stabilizer | 0.25 | 0.25 | 0.25 | 0.25 | 0.25 | 0.25 | 0.25 | 0.25 | 0.25 |
| N-774-SRF-HM-Black | 50.00 | 50.00 | 50.00 | 50.00 | 50.00 | 50.00 | 50.00 | 50.00 | 50.00 |
| Dos. Dioctyl Sebacate | 25.00 | 25.00 | 25.00 | 25.00 | 25.00 | 25.00 | 25.00 | 25.00 | 25.00 |
| Accel. Type-17-Powder | — | — | — | 1.75 | 2.00 | 2.25 | 2.50 | 2.75 | 3.00 |
| CAPTAX | — | 1.00 | 1.75 | — | — | — | — | — | — |
| Methyl Tuads | — | — | 1.50 | — | — | — | — | — | — |
| Ethyl Tullurac | — | 1.00 | 1.00 | — | — | — | — | — | — |
| Sulfads | — | 1.00 | 1.00 | — | — | — | — | — | — |
| Santocure-NS | — | 1.00 | — | — | — | — | — | — | — |
| RM-Sulphur | — | 2.00 | 1.00 | — | — | — | — | — | — |
| Totals | 175.25 | 181.25 | 181.50 | 177.50 | 177.25 | 177.50 | 177.75 | 178.00 | 178.25 |

TABLE 4b

Physical properties of the product compounds of Table 4a.

| Observed Results | Control | Control | Control | Type-17 Powder | Type-17 Powder | Type-17 Powder | Type-17 Powder | Type-17 Powder | Type-17 Powder |
|---|---|---|---|---|---|---|---|---|---|
| Mixing Time | 3-min | 3-min | 3-min | 3-min | 3-min | 3-min | 3-min | 3-min | 3-min |
| Dump Temp. | 285° F. | 285° F. | 285° F. | 285° F. | 285° F. | 285° F. | 285° F. | 285° F. | 285° F. |
| Mooney-M4 @ 212° F. | 61 | 52 | 55 | 60 | 60 | 60 | 60 | 60 | 60 |
| Scorch C 330° F. | — | 3-min | 3-min | 3-min | 3-min | 3-min | 3-min | 3-min | 3-min |
| 100% Cure C 330° F. | — | 5-min | 5-min | 5-min | 5-min | 5-min | 5-min | 5-min | 5-min |
| Tensile PSI | 1,250 | 1,080 | 1,180 | 2,680 | 2,840 | 3,010 | 3,030 | 3,050 | 3,050 |
| Modules C 100% | 320 | 300 | 320 | 510 | 540 | 630 | 640 | 650 | 650 |
| Elongation % | 205 | 160 | 150 | 360 | 350 | 450 | 450 | 500 | 500 |
| Die "C" Tear | 240 | 175 | 180 | 290 | 290 | 300 | 320 | 320 | 330 |
| Shore "A" Hardness | 70 | 65 | 71 | 80 | 80 | 80 | 80 | 80 | 80 |
| Compression Set, ASTM-D-395 Method B | 20 | 22 | 25 | 13 | 11 | 10 | 9 | 9 | 9 |

TABLE 4b-continued

Physical properties of the product compounds of Table 4a.

| Observed Results | Control | Control | Control | Type-17 Powder | Type-17 Powder | Type-17 Powder | Type-17 Powder | Type-17 Powder | Type-17 Powder |
|---|---|---|---|---|---|---|---|---|---|
| Flexing Test ASTM-D-1052: | | | | | | | | | |
| 35° F. Cycles to Break | 1,370 | 980 | 900 | 3,218 | 3,270 | 3,320 | 3,380 | 3,410 | 3,505 |
| 182° F. Cycles to Break | 6,570 | 3,160 | 2,978 | 7,621 | 7,690 | 7,810 | 7,860 | 7,990 | 8,108 |

TABLE 5a

Vulcanization of a carbon-black-filled ABS-resin with an SBR elastomer using the TE-Super Accelerator Type-17 powder.

| Samples added 2½ minutes before dumping batch @ 40-RPM-Rotor speed | Control | Control | Control | Type-17 Powder | Type-17 Powder | Type-17 Powder | Type-17 Powder | Type-17 Powder | Type-17 Powder |
|---|---|---|---|---|---|---|---|---|---|
| ABS-RESIN | 50.00 | 50.00 | 50.00 | 50.00 | 50.00 | 50.00 | 50.00 | 50.00 | 50.00 |
| SBR-1500 | 50.00 | 50.00 | 50.00 | 50.00 | 50.00 | 50.00 | 50.00 | 50.00 | 50.00 |
| UV STABILIZER | 0.25 | 0.25 | 0.25 | 0.25 | 0.25 | 0.25 | 0.25 | 0.25 | 0.25 |
| N-774-SAF-HM-BLACK | 50.00 | 50.00 | 50.00 | 50.00 | 50.00 | 50.00 | 50.00 | 50.00 | 50.00 |
| Dos. Dioctyl Sebacate | 25.00 | 25.00 | 25.00 | 25.00 | 25.00 | 25.00 | 25.00 | 25.00 | 25.00 |
| TE-Super Accelerator | — | — | — | 1.50 | 1.75 | 2.00 | 2.25 | 2.50 | 2.75 |
| Santocure NS | — | 0.70 | — | — | — | — | — | — | — |
| AMAX | — | — | 0.70 | — | 0.70 | — | — | — | — |
| RM-Sulphur | — | 3.00 | 3.00 | — | — | — | — | — | — |
| TOTALS | 175.25 | 178.95 | 178.95 | 176.75 | 177.00 | 177.25 | 177.50 | 177.75 | 178.00 |

TABLE 5b

Physical properties of the product compounds of Table 5a.

| Observed Results | Control | Control | Control | Type-17 Powder | Type-17 Powder | Type-17 Powder | Type-17 Powder | Type-17 Powder | Type-17 Powder |
|---|---|---|---|---|---|---|---|---|---|
| Mixing Time | 3-min | 3-min | 3-min | 3-min | 3-min | 3-min | 3-min | 3-min | 3-min |
| Dump Temp. | 295° F. | 290° F. | 290° F. | 290° F. | 290° F. | 290° F. | 290° F. | 290° F. | 290° F. |
| Mooney-ML-4 @ 212° F. | 61 | 62 | 60 | 60 | 60 | 60 | 60 | 60 | 60 |
| Scorch @ 330° F. | — | 3-min | 3-min | 3-min | 3-min | 3-min | 3-min | 3-min | 3-min |
| 100% Cure @ 330° F. | — | 5-min | 5-min | 5-min | 5-min | 5-min | 5-min | 5-min | 5-min |
| Tensile-PSI | 1,250 | 1,150 | 1,060 | 2,550 | 2,690 | 2,850 | 3,050 | 3,075 | 3,075 |
| Modulus @ 100% | 330 | 280 | 205 | 480 | 510 | 550 | 640 | 650 | 650 |
| Elongation % | 200 | 160 | 120 | 325 | 360 | 360 | 475 | 500 | 500 |
| Die "C" Tear | 250 | 165 | 95 | 240 | 290 | 290 | 300 | 320 | 310 |
| Shore "A" Hardness | 70 | 55 | 48 | 80 | 80 | 80 | 80 | 80 | 80 |
| Compression Set, ASTM-D-395-method D-B | 19 | 27 | 30 | 14 | 13 | 12 | 11 | 9 | 9 |
| Flexing Test ASTM-D-1052: | | | | | | | | | |
| 32° F. Cycles to Break | 1,297 | 1,066 | 800 | 3,212 | 3,640 | 3,777 | 3,840 | 3,922 | 4,116 |
| 182° F. Cycles to Break | 6,547 | 3,960 | 2,790 | 6,993 | 7,710 | 7,980 | 8,640 | 9,310 | 9,512 |
| Abrasion Resistance ASTM-D-1242 | | | | | | | | | |
| Cycles to Break | 15,540 | 9,740 | 8,644 | 18,960 | 19,490 | 19,760 | 20,633 | 21,322 | 21,497 |

60

TABLE 6a

Vulcanization of a carbon-black-filled polyethylene resin with a polyisoprene elastomer using the TE-Super Accelerator Type-17 powder.

| Samples added 2½ minutes before dumping batch @ 40-RPM-Rotor speed | Control | Control | Control | Type-17 Powder | Type-17 Powder | Type-17 Powder | Type-17 Powder | Type-17 Powder | Type-17 Powder |
|---|---|---|---|---|---|---|---|---|---|
| Polyethylene-resin | 50.00 | 50.00 | 50.00 | 50.00 | 50.00 | 50.00 | 50.00 | 50.00 | 50.00 |
| NATSYN-2200 | 50.00 | 50.00 | 50.00 | 50.00 | 50.00 | 50.00 | 50.00 | 50.00 | 50.00 |
| UV Stabilizer | 0.25 | 0.25 | 0.25 | 0.25 | 0.25 | 0.25 | 0.25 | 0.25 | 0.25 |
| N-774-SAF-HM-BLACK | 50.00 | 50.00 | 50.00 | 50.00 | 50.00 | 50.00 | 50.00 | 50.00 | 50.00 |
| Dos.Dioctyl Sebacate | 25.00 | 25.00 | 25.00 | 25.00 | 25.00 | 25.00 | 25.00 | 25.00 | 25.00 |
| TE-Super Accelerator | — | — | — | 1.00 | 1.50 | 2.00 | 2.5 | 25.00 | 27.50 |
| Santocure NS | — | 0.70 | — | — | — | — | — | — | — |
| AMAX | — | — | 0.70 | — | — | — | — | — | — |
| RM-Sulphur | — | 3.00 | 3.00 | — | — | — | — | — | — |
| TOTALS | 175.25 | 178.95 | 178.95 | 176.75 | 177.00 | 177.25 | 177.50 | 177.75 | 178.00 |

TABLE 6b

Physical properties of the product compounds of Table 6a.

| Results Observed | Control | Control | Control | Type-17 Powder | Type-17 Powder | Type-17 Powder | Type-17 Powder | Type-17 Powder | Type-17 Powder |
|---|---|---|---|---|---|---|---|---|---|
| Mixing Time | 3-min | 3-min | 3-min | 3-min | 3-min | 3-min | 3-min | 3-min | 3-min |
| Dump Temp. | 290° F. | 290° F. | 290° F. | 290° F. | 290° F. | 290° F. | 290° F. | 290° F. | 290° F. |
| Mooney-ML-4 @ 212° F. | 50 | 50 | 50 | 55 | 55 | 55 | 55 | 55 | 55 |
| Scorch @ 330° F. | — | 3-min | 3-min | 3-min | 3-min | 3-min | 3-min | 3-min | 3-min |
| 100% Cure @ 330° F. | — | 5-min | 5-min | 5-min | 5-min | 5-min | 5-min | 5-min | 5-min |
| Tensile-PSI | 1000 | 1100 | 1050 | 2400 | 2500 | 2600 | 2740 | 2950 | 3000 |
| Modulus @ 100% | 135 | 150 | 140 | 290 | 380 | 490 | 520 | 560 | 560 |
| Elongation % | 100 | 120 | 110 | 260 | 320 | 330 | 370 | 390 | 395 |
| Die "C" Tear | 125 | 140 | 130 | 210 | 240 | 260 | 290 | 300 | 300 |
| Shore "A" Hardness | 70 | 73 | 71 | 75 | 75 | 75 | 75 | 75 | 75 |
| Compression Set, ASTM-395-method B | 29 | 27 | 26 | 19 | 18 | 16 | 14 | 12 | 11 |
| Flexing Test, ASTM-D-1052: | | | | | | | | | |
| 32° F. Cycles to Break | 1,166 | 1,240 | 1,190 | 2,290 | 2,380 | 3,360 | 3,890 | 3,937 | 4,060 |
| 182° F. Cycles to Break | 5,240 | 5,580 | 5,117 | 6,240 | 6,270 | 7,240 | 7,807 | 8,732 | 9,312 |
| Abrasion Resistance, ASTM-D-1242 Cycles to Break | 7,666 | 7,940 | 7,297 | 17,212 | 18,431 | 18,722 | 19,272 | 21,012 | 21,340 |

TABLE 7a

Vulcanization of a carbon-black-filled PVC Resin with a polyisoprene elastomer using the TE-Super Accelerator.

| Samples added 2½ minutes before dumping batch @ 40-RPM-Rotor speed | Control | Control | Control | Type-17 Powder | Type-17 Powder | Type-17 Powder | Type-17 Powder | Type-17 Powder | Type-17 Powder |
|---|---|---|---|---|---|---|---|---|---|
| PVC-Resin | 50.00 | 50.00 | 50.00 | 50.00 | 50.00 | 50.00 | 50.00 | 50.00 | 50.00 |
| NATSYN-2200 | 50.00 | 50.00 | 50.00 | 50.00 | 50.00 | 50.00 | 50.00 | 50.00 | 50.00 |
| UV Stabilizer | 0.25 | 0.25 | 0.25 | 0.25 | 0.25 | 0.25 | 0.25 | 0.25 | 0.25 |
| N-774-SAF-HM-BLACK | 50.00 | 50.00 | 50.00 | 50.00 | 50.00 | 50.00 | 50.00 | 50.00 | 50.00 |

TABLE 7a-continued

Vulcanization of a carbon-black-filled PVC Resin with a polyisoprene elastomer using the TE-Super Accelerator.

| Samples added 2½ minutes before dumping batch @ 40-RPM-Rotor speed | Control | Control | Control | Type-17 Powder | Type-17 Powder | Type-17 Powder | Type-17 Powder | Type-17 Powder | Type-17 Powder |
|---|---|---|---|---|---|---|---|---|---|
| Dos.Dioctyl Sebacate | 25.00 | 25.00 | 25.00 | 25.00 | 25.00 | 25.00 | 25.00 | 25.00 | 25.00 |
| TE-Super Accelerator | — | — | — | 1.50 | 1.75 | 2.00 | 2.25 | 2.50 | 2.75 |
| Santocure NS | — | 0.70 | — | — | — | — | — | — | — |
| AMAX | — | — | 0.70 | — | — | — | — | — | — |
| RM-Sulphur | — | 3.00 | 3.00 | — | — | — | — | — | — |
| TOTALS | 175.25 | 178.95 | 178.95 | 176.75 | 177.00 | 177.25 | 177.50 | 177.75 | 178.00 |

TABLE 7b

Physical properties of the product compounds of Table 7a.

| Results Observed | Control | Control | Control | Type-17 Powder | Type-17 Powder | Type-17 Powder | Type-17 Powder | Type-17 Powder | Type-17 Powder |
|---|---|---|---|---|---|---|---|---|---|
| Mixing Time | 3-min | 3-min | 3-min | 3-min | 3-min | 3-min | 3-min | 3-min | 3-min |
| Dump Temp. | 290° F. | 290° F. | 290° F. | 290° F. | 290° F. | 290° F. | 290° F. | 290° F. | 290° F. |
| Mooney-ML-4 @ 212° F. | 55 | 60 | 60 | 60 | 60 | 60 | 60 | 60 | 60 |
| Scorch @ 330° F. | — | 3-min | 3-min | 2-min | 2-min | 2-min | 2-min | 2-min | 2-min |
| 100% Cure @ 330° F. | — | 5-min | 5-min | 4-min | 4-min | 4-min | 4-min | 4-min | 4-min |
| Tensile-PSI | 900 | 1,000 | 950 | 2,300 | 2,500 | 2,600 | 2,750 | 2,900 | 2,900 |
| Modulus @ 100% | 120 | 125 | 100 | 390 | 400 | 480 | 550 | 570 | 580 |
| Elongation % | 90 | 100 | 80 | 290 | 310 | 320 | 380 | 400 | 400 |
| Die "C" Tear | 140 | 150 | 120 | 275 | 300 | 300 | 320 | 350 | 360 |
| Shore "A" Hardness | 70 | 70 | 70 | 80 | 80 | 80 | 80 | 80 | 80 |
| Compression Set, ASTM-D-395-method B | 30 | 29 | 30 | 18 | 17 | 16 | 12 | 11 | 10 |
| Flexing Test, ASTM-D-1052: | | | | | | | | | |
| 32° F. Cycles to Break | 947 | 1,060 | 887 | 1,387 | 2,444 | 3,340 | 3,997 | 4,711 | 4,970 |
| 182° F. Cycles to Break | 2,120 | 2,340 | 1,945 | 5,216 | 6,180 | 6,980 | 7,879 | 8,840 | 9,437 |
| Abrasion Resistance ASTM-D-1242 Cycles to Break | 4,944 | 5,566 | 3,640 | 16,121 | 17,630 | 17,921 | 18,730 | 19,014 | 21,480 |

TABLE 8a

The use of the TE-Super Accelerator as a primary accelerator in curing Hypalon elastomer.

| Samples added 2½ minutes before dumping batch @ 40-RPM-Rotor speed | Control | Type-17 Powder | After 24 hr. Control | Age Type-17 Powder |
|---|---|---|---|---|
| Hypalon-40 | 100.00 | 100.00 | | |
| N-774-SAF-Black | 65.00 | 65.00 | | |
| SUNDEX-790 | 48.00 | 48.00 | | |
| TE-Super Accelerator | — | 4.50 | | |
| 90%-Active Utharge Dispersion | 10.00 | — | | |
| Zinc Oxide | 2.00 | — | | |
| Tetrone-A | 1.50 | 0.50 | | |
| Totals | 226.50 | 218.00 | | |

TABLE 8b

Physical properties of the product compounds of Table 8a.

| Results Observed | Control | Type-17 Powder | 24 hr. Control | Type-17 Powder |
|---|---|---|---|---|
| Mixing Time | 5-min | 5-min | | |
| Dump Temp. | 285° F. | 280° F. | | |
| ● = Add Tetrone A-on Mill | ● | ● | | |
| Mooney ML4 @ 212° F. | 58 | 56 | 56 | 54 |
| Scorch @ 320° F. | 6-min | 6-min | 6-min | 6-min |
| 100% Cure @ 320° F. | 8-min | 8-min | 8-min | 8-min |
| Tensile PSI | 3000 | 3260 | 3160 | 3430 |
| Modulus @ 100% | 600 | 620 | 630 | 660 |
| Elongation % | 280 | 300 | 295 | 320 |
| Die "C" Tear | 180 | 205 | 200 | 215 |
| Grams Release Mold | 6112 | 5810 | 6112 | 5810 |
| Shore "A" Hardness | 70 | 70 | 70 | 70 |
| Compression Set, ASTM D-395-Method B = | 18 | 12 | 15 | 9 |

TABLE 9a

Vulcanization of a natural rubber extrusion compound using the TE-Super Accelerator.

| Samples added 2½ minutes before dumping batch @ 40-RPM-Rotor speed | Control | Type-17 Powder | Type-17 Powder | Type-17 Powder | Type-17 Powder | Type-17 Powder |
|---|---|---|---|---|---|---|
| SMR-5 | 100.00 | 100.00 | 100.00 | 100.00 | 100.00 | 100.00 |
| N-550-FEF Black | 80.00 | 80.00 | 80.00 | 80.00 | 80.00 | 80.00 |
| Stearic Acid | 0.50 | 0.50 | 0.50 | 0.50 | 0.50 | 0.50 |
| Zinc Oxide | 5.00 | 5.00 | 5.00 | 5.00 | 5.00 | 5.00 |
| Circo Light Oil | 19.00 | 19.00 | 19.00 | 19.00 | 19.00 | 19.00 |
| Santo Cure NS | 1.00 | | | | | |
| TE-Super Accelerator | | 0.70 | 0.80 | 0.90 | 1.00 | 1.10 |
| Rm-Sulphur | 3.00 | 2.75 | 2.50 | 2.25 | 2.00 | 1.75 |
| Totals | 208.50 | 207.95 | 207.80 | 207.65 | 207.50 | 207.35 |

TABLE 9b

Physical properties of the product compounds of Table 9a.

| Results Observed | Control | Type-17 Powder | Type-17 Powder | Type-17 Powder | Type-17 Powder | Type-17 Powder |
|---|---|---|---|---|---|---|
| Mixing Time | 5-min | 5-min | 5-min | 5-min | 5-min | 5-min |
| Dump Temperature | 290° F. | 290° F. | 290° F. | 290° F. | 290° F. | 285° F. |
| ● = Add Sulphur on Mill | ● | ● | ● | ● | ● | |
| Mooney -ML-4 @ 212° F. | 38 | 27 | 28 | 26 | 26 | 26 |
| Scorch @ 320° F. | 4-min | 4-min | 4-min | 4-min | 4-min | 4-min |
| 100% Cure @ 320° F. | 8-min | 8-min | 8-min | 8-min | 8-min | 8-min |
| Tensile PSI | 2000 | 2250 | 2630 | 2840 | 2960 | 2960 |
| Modulus @ 100% | 760 | 820 | 950 | 990 | 1000 | 1000 |
| Elongation % | 370 | 410 | 570 | 585 | 610 | 610 |
| Die "C" Tear | 190 | 250 | 320 | 350 | 390 | 390 |
| Shore "A" Hardness | 67 | 67 | 67 | 67 | 67 | 65 |
| Grams Release Mold | 5920 | 5913 | 5910 | 5887 | 5860 | 5843 |
| Compression Set ASTM-D-395-Method B = | 38 | 24 | 22 | 20 | 19 | 19 |

What is claimed is:

1. A rubber and plastic accelerator comprising a formulation for accelerating the vulcanization or curing of rubber or plastic wherein the formulation comprises:

an accelerator compound comprised of an organic-based quaternary ammonium salt selected from the group consisting of trimethylbetahydroxyethyl ammonium hydroxide (TMBHEAH), carboxymethyltrimethyl ammonium hydroxide (CMTAH), methylallylbenzylphenol ammonium iodide, benzyltriethyl ammonium chloride, hexadecyltrimethyl ammonium chloride and imidazolium compounds;

a hydrated silica compound;

an inorganic peroxide;

an inorganic compound for accelerating peroxide oxidation;

an alkaline silicate;

a silicone copolymer fluid;

a free fatty acid ester emulsifier;

a tertiary amine;

a percarbonate; and a preservative.

2. A rubber and plastic accelerator comprising a formulation for accelerating the vulcanization or curing of rubber or plastic wherein the formulation includes an accelerator compound comprising trimethylbetahydroxyethyl ammonium hydroxide and carboxymethyltrimethyl ammonium hydroxide.

3. A rubber and plastic accelerator comprising a formulation for accelerating the vulcanization or curing of rubber or plastic wherein the formulation comprises:

an accelerator compound comprised of an organic-based quaternary ammonium salt selected from the group consisting of trimethylbetahydroxyethyl ammonium hydroxide (TMBHEAH), carboxymethyltrimethyl ammonium hydroxide (CMTAH), methylallylbenzylphenol ammonium iodide, benzyltriethyl ammonium chloride, hexadecyltrimethyl ammonium chloride and imidazolium compounds; and an inorganic peroxide comprising calcium peroxide in an amount of from about 4.25 to about 8.5 weight percent of the formulation.

* * * * *